Aug. 23, 1960  R. TONELLI  2,949,996
ARTICLE CONVEYOR AND TRANSFER MECHANISM
Filed July 8, 1957  3 Sheets-Sheet 2
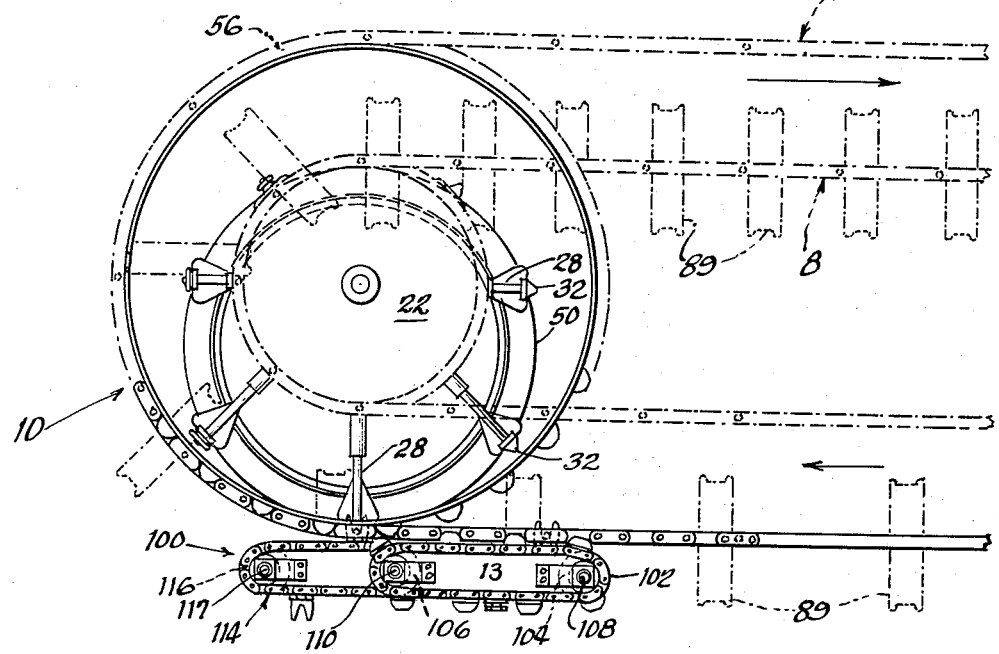
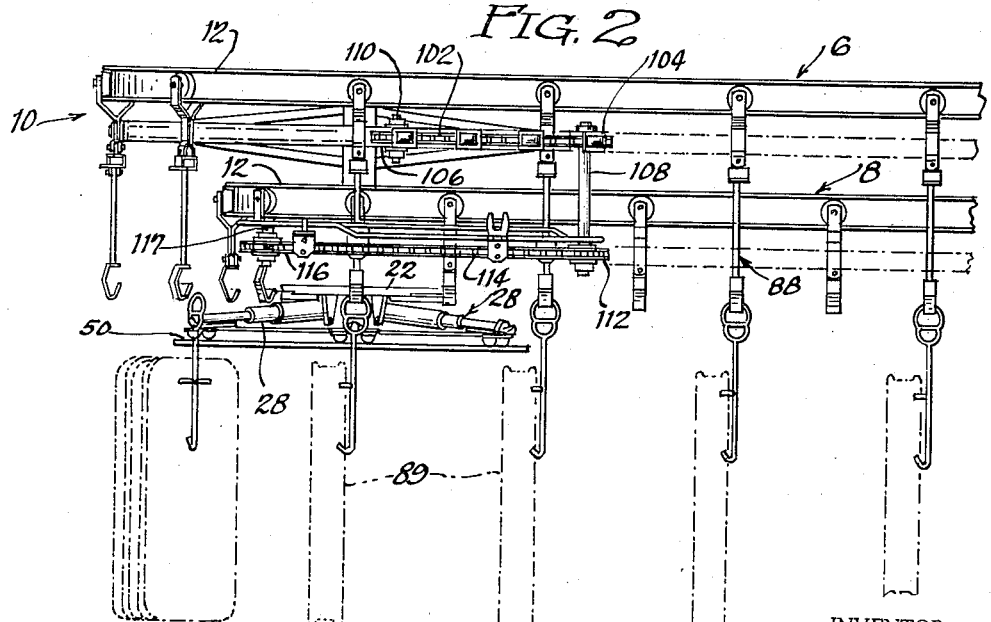
INVENTOR.
Roger Tonelli
BY
Ooms, McDougall, Williams & Hersh
Attorneys

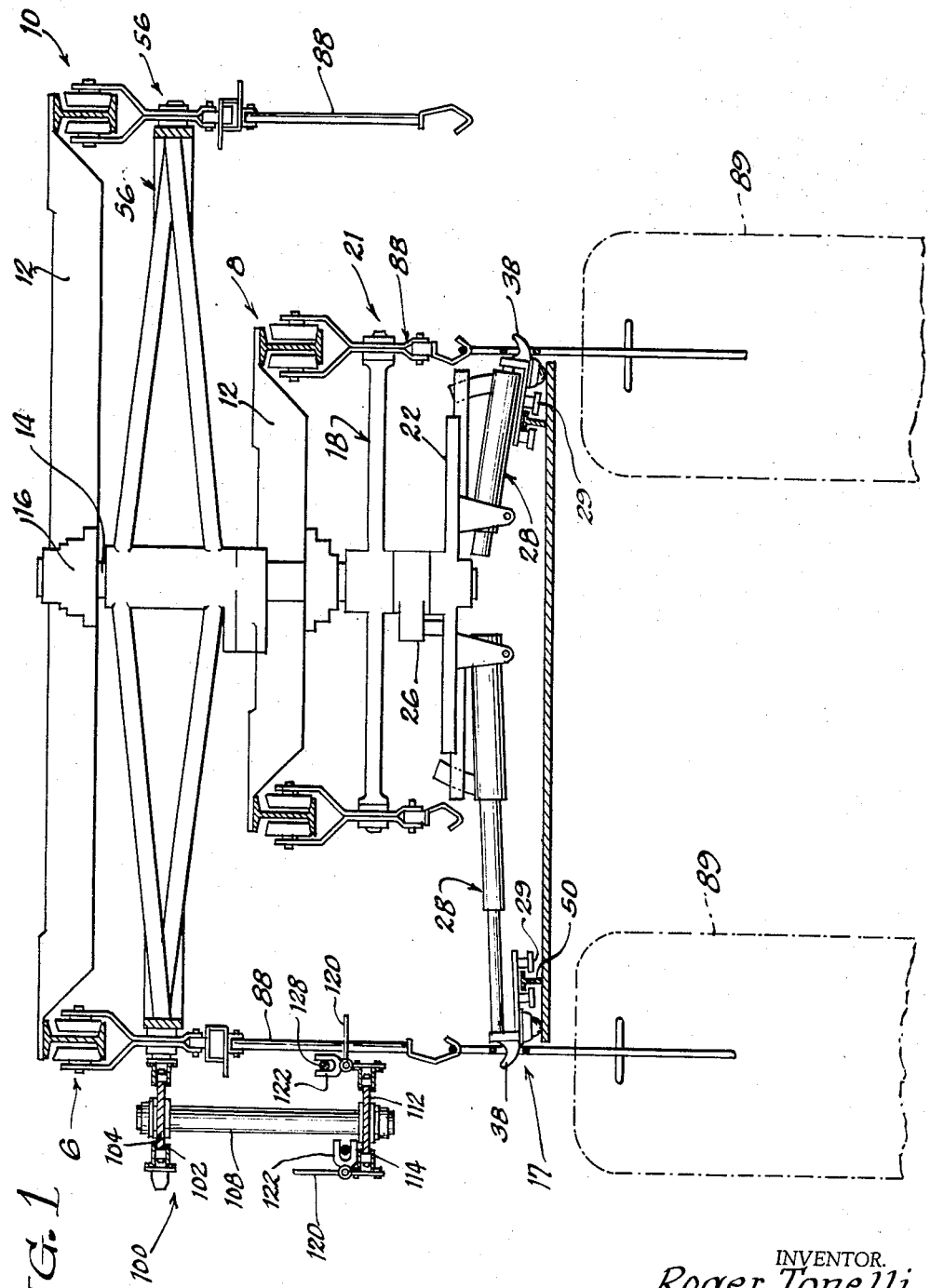

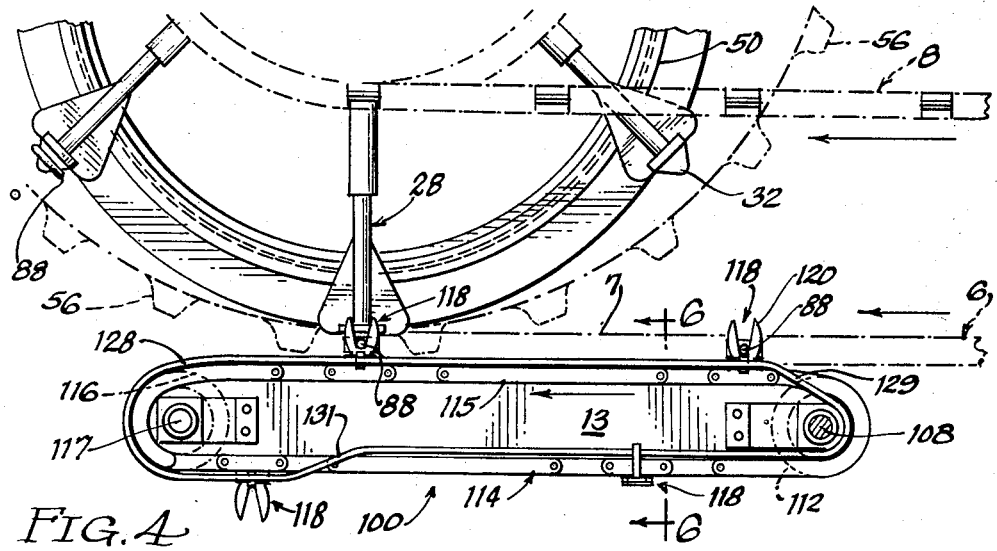
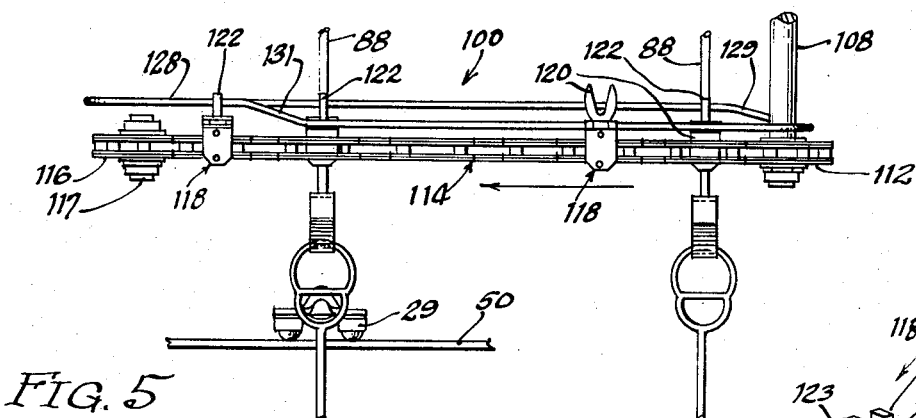
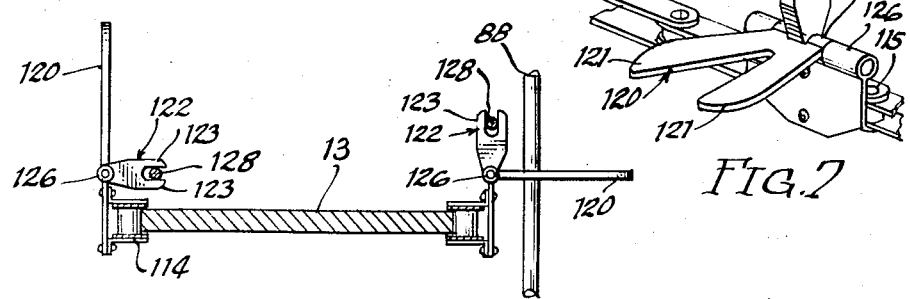

United States Patent Office 2,949,996
Patented Aug. 23, 1960

2,949,996
ARTICLE CONVEYOR AND TRANSFER MECHANISM

Roger Tonelli, Chicago, Ill., assignor to Radio Steel & Mfg. Co., Chicago, Ill., a corporation of Illinois Filed July 8, 1957, Ser. No. 670,455

16 Claims. (Cl. 198—25)

This invention relates to a conveyor system and more particularly to an apparatus for steadying support members pivotally suspended from a conveyor system.

Conveyor systems, and particularly those used in factories, comprise a moving belt or chain to which are suspended uniformly spaced support members for carrying the articles to be treated. These support members are usually pivotally connected to the conveyor system so the articles can be rotated to satisfy treating requirements or space limitations. This pivotal connection, however, permits the article being carried to develop objectionable pendulum-like swaying movements and these movements can be severe enough to interfere with the passage of the article through confined treating areas. They may even be severe enough to cause the article to fall from the support member.

More recently, transfer stations, such as those described in my copending application Ser. No. 660,163, filed May 20, 1957, have been developed which automatically transfer articles carried by one moving conveyor system to another. These transfer stations find use in factories in which a main conveyor system is used to carry the article from one treating area to another. There the articles are transferred to a spur conveyor system which is used to carry the article through the treating area. When the treatment involves painting, for example, the support members on the spur conveyor system are made substantially longer than the support members on the main conveyor system in order to prevent the spur conveyor system from becoming thickly covered with paint as it repeatedly passes through the treating area. This added length creates problems because it greatly multiplies the objectionable swaying movements of the articles being carried, and these swaying movements must be largely eliminated before the article enters the transfer station, or else the transfer mechanism will not work. This presents a difficult problem because it frequently happens that space limitations in the factory require the conveyor systems to take a serpentine path to the transfer station. What is needed, therefore, and comprises the chief object of the invention, is an apparatus which can effectively stop swaying movements of support members pivotally suspended from conveyor systems regardless of the path followed by the conveyor system.

Another object of this invention is to provide an apparatus for a transfer station which steadies support members pivotally suspended from conveyor systems before they enter the station.

Yet another object of this invention is to provide an apparatus for steadying support members pivotally suspended from conveyor systems which is compact, durable, and economical to make.

These and other objects of this invention will become more apparent when read in the light of the accompanying drawings and specification wherein—

Figure 1 is a front elevation of the transfer station showing a front elevational view of the steadying mechanism;

Figure 2 is a side elevation of the transfer station and the associated apparatus for steadying the support members;

Figure 3 is a plan view showing the support member steadying apparatus connected to a transfer station;

Figure 4 is a fragment of the plan view of the transfer station showing details of the steadying mechanism with greater clarity;

Figure 5 is a side elevational view of a portion of the steadying mechanism showing details of the guideway;

Figure 6 is a sectional view taken on the line 6—6 of Figure 4, and

Figure 7 is a perspective view of a steadying member.

Referring now to Figure 1 of the drawings, a transfer station indicated generally as 10 and described more fully in copending application Ser. No. 660,163, filed May 20, 1957, comprises a fixed support 12. A support shaft 14 is rigidly secured to support 12 by a collar 16. Sprocket wheels 18 and 56 are rotatably mounted on shaft 14. These sprocket wheels are engaged and driven by the spur conveyor system 6 and the main conveyor system 8. A movable support disk 22 also rotatably mounted on shaft 14 is rigidly secured to sprocket wheel 18 by means of a collar 26. A plurality of extensible material holders indicated generally as 28 and terminating in a material holding hook 38 are pivotally mounted on the support disk 22 in uniformly spaced angular relation. Each material holder 28 has a guide portion 29 which is adapted to ride on a cam guide track 50, see Figure 3.

In operation, as seen in Figure 3, the main conveyor system 8 with its short support members 88 enters the station 10 at a second transfer point 21. Then it engages sprocket wheel 18, and causes it to rotate with a linear velocity equal to its speed. This rotation is transmitted to the support disk 22. The rotation of the support disk 22 carries the extensible material holders 28 with it, and these are expanded, compressed, raised, and lowered, in accordance with the shape of the cam guide plate 50. The support disk 22, its speed of rotation, the spacing of the material holders on the cam guide track act as a synchronization guide means so that the successive arrival of each long pivotally suspended support member 88 at the first transfer point 17 at the entrance to the station is synchronized with the arrival of a material holder 28. When this happens, the article 89 carried by the support member 88, which in the example shown is a wagon, see Figure 2, is then transferred to the material holder 28 for subsequent transfer to the main conveyor system 8 at the second transfer point 21, see Figure 1. It is apparent, however, that the material holders 28 and support members 88 must be precisely positioned when they come together, or else the article will not be transferred. Any swaying motion by the article 89 and the support member 88 would therefore make the transfer mechanism inoperative.

The steadying mechanism indicated generally as 100 comprises a sprocket chain 102 which is rotatably mounted on sprocket wheels 104 and 106, see Figure 3. These sprocket wheels are rigidly mounted on shafts 108 and 110 which are rotatably mounted in the fixed support 13. The sprocket chain, as seen in Figure 3, engages and is driven by the conveyor chain of the moving conveyor system 6. The movement of the sprocket chain 102 drives the sprocket wheel 104. The rotation of the sprocket wheel 104 in turn rotates shaft 108, see Figure 2. The rotation of shaft 108 drives another sprocket wheel 112 which is rigidly mounted on the shaft and spaced below sprocket wheel 104, see Figure 1. A second endless chain 114 is mounted on the driving sprocket wheel 112 and the carrier sprocket wheel 116, see Figure 2. The carrier sprocket wheel 116 is rotatably mounted on the shaft 117 which is rigidly mounted on the fixed support 13 by conventional means (not shown). The size and numbers of teeth on the sprocket wheels 112 and 104 are arranged so that the second endless chain 114 is driven at a speed equal to the speed of the spur conveyor system 6 for reasons to be described below. The endless chain 114 moves in an orbit determined by the sprocket wheels 112 and 116, but it is apparent by providing additional carrier or rider sprocket wheels and conventional spacing devices, the endless chain 114 could be made to follow any predetermined orbit.

Four steadying members indicated generally as 118 are mounted on the chain 114, see Figure 4. These steadying members are adapted to be pivoted into steadying engagement with the support members 88 being carried along by the conveyor system 6. This requires that a portion 115 of the orbit of the chain 114 be substantially parallel with and adjacent to a part 7 of the path followed by the conveyor system 6. In the example shown, the conveyor system 6 happens to be moving in a straight line as it enters the station 10 and so the part 115 of the orbit of the endless chain 114, as seen in Figure 3, is also moving in a straight line. Since the chain 114 moves at the same speed as the conveyor system 6, the steadying members 118 can be spaced on chain 114 so they arrive at portion 115 of the orbit of the chain 114 in synchronization with and opposite to the support members 88 arriving on part 7 of the path followed by moving conveyor system 6.

Each steadying member 118 comprises a support member engaging fork 120 and a fork shaped guide member 122. As seen in Figure 7, the fork shaped guide member 122 and the support member engaging fork 120 are rigidly connected to a pivot shaft 124 and are perpendicular to each other. The pivot shaft rotates in a bearing member 126 rigidly connected to the links 115 of the endless chain 114.

A guide track 128 is formed from a rod bent to form a closed loop. This guide track is rigidly mounted on the fixed support 13 by conventional mounting means (not shown). As seen in Figure 6, the guide track 128 is positioned between the tines 123 of the fork shaped guide member 122. With this arrangement, as the steadying member 118 is carried along by the endless chain 114, it will be pivoted with respect to the chain 114 in accordance with variations in the path followed by the guide track 128. Each steadying member, as stated above, arrives at portion 115 of the orbit of the endless chain in synchronization with the arrival of the pivotally suspended support members to part 7 of the path of the moving conveyor system 6. In order to damp out swaying movements of the pivotally suspended support members, the support members must move between the tines 121 of the support member engaging fork 120. Since the steadying members are moving at the same speed as the support members, this can be conveniently done by pivoting the support member engaging fork 120 into position with the support member 88. This was accomplished by bending the guide track at 129 upwardly and outwardly, see Figures 4 and 5, and this caused the fork shaped guide member following the guide track to pivot with respect to the chain 114 and moved the support member engaging fork 120 from its vertical or retracted position to a horizontal or support member engaging position, see Figure 6. In order to repeat the cycle, the support member engaging fork must again be moved to a vertical position. This was done by bending the guide track 128 downwardly and inwardly at 131, see Figure 4.

With this arrangement, each support member 88 arriving at part 7 of its path to the transfer station 10 will move between the tines 121 of a support member engaging fork and if the support member is swaying excessively, it will rub against these tines. This engagement which is caused by movements transverse to the plane of rotation of the steadying member 118 will effectively stop this undesired sway and steady the support members. Thus, each support member will enter the transfer station 10 in position to be engaged by the transfer apparatus.

The steadying mechanism has been described so far as associated with a transfer station. It will be apparent, however, that it can be used at any part of the conveyor system where it is desirable to eliminate excessive swaying movements of the articles carried by the conveyor system. Furthermore, the steadying mechanism will operate regardless of the path followed by the conveyor system.

The invention may be embodied in other forms without departing from the spirit or essential characteristics thereof, as set forth in the claims, and the present embodiment is therefore to be considered as illustrative and not restrictive, and it is intended to include all changes which come within the scope and range of the claims.

I claim:

1. An apparatus for steadying a plurality of moving elements suspended from a moving conveyor system comprising a driven member, said driven member operatively connected to said conveyor system to be driven thereby, said driven member drivingly connected to a moving support, said moving support comprising an endless flexible member, means connected to said endless flexible member to cause it to move in any predetermined orbit, steadying members pivotally mounted on said endless flexible member for rocking movement between element engaging position and element releasing position, guide means operatively engaged by said steadying members for rocking said steadying members during movement with said endless flexible member between element engaging position and element releasing position.

2. An apparatus for steadying a plurality of moving elements suspended from a moving conveyor system comprising a fixed support, a driven member movably mounted on said fixed support, said driven member operatively connected to said conveyor system to be driven thereby, said driven member drivingly connected to a moving support, said moving support comprising an endless chain, means connected to said endless chain to cause it to move in any predetermined orbit, at least one steadying member mounted on said endless chain for rocking movement between element engaging position and element releasing position, said steadying member terminating in an element engaging fork, a guide member on said steadying member, a guide track mounted on said fixed support, said guide member riding in said guide track, said guide track shaped to rock said steadying member for a portion of said orbit to element engaging position so that the element engaging fork can engage and steady said moving elements.

3. An apparatus for steadying a plurality of moving elements suspended from a moving conveyor system comprising a fixed support, a driven member movably mounted on said fixed support, said driven member operatively connected to said conveyor system to be driven thereby, said driven member drivingly connected to a moving support, said moving support comprising an endless chain, means connected to said endless chain to cause it to move in any predetermined orbit, at least one steadying member pivotally mounted on said endless chain for movement between an element engaging position and a retracted position, a guide member on said steadying member, a guide track mounted on said fixed support, said guide member riding on said guide track, said guide track shaped to move said steadying member into the element engaging position for a portion of said orbit so that the steadying member can engage and steady said moving elements.

4. An apparatus for steadying a plurality of moving elements comprising a fixed support, a driven first chain movably mounted on said fixed support, said first chain drivingly connected to a second endless chain, means connected to said second endless chain to cause it to move in any predetermined orbit, at least one steadying member piovtally mounted on said second endless chain and movable between a retracted position and an element engaging position, said steadying member including an element engaging fork and a guide member, said guide member rigidly connected to said element engaging fork, a guide track mounted on said fixed support, said guide member riding on said guide track, said guide track shaped to pivot said element engaging fork into said element engaging position for engaging and steadying said moving elements.

5. An apparatus for steadying a plurality of moving elements comprising a fixed support, a driven first chain movably mounted on said fixed support, said first chain drivingly connected to a second endless chain, means connected to said second endless chain to cause it to move in any predetermined orbit, at least one steadying member pivotally mounted on said endless chain, said steadying member including an element engaging fork and a fork shaped guide member, said fork shaped guide member rigidly connected to said element engaging fork and perpendicular thereto, a guide track mounted on said fixed support, said guide track comprising a rod bent to form a closed loop, said guide track positioned between the tines of said fork shaped guide member, and shaped to pivot said element engaging fork into position for engaging and steadying said moving elements for a portion of said orbit as the steadying member moves around said predetermined orbit.

6. An apparatus for steadying a plurality of moving elements comprising a fixed support, a shaft rotatably mounted on said fixed support, a first sprocket wheel rigidly secured to said shaft, a driven first chain mounted on said first sprocket wheel, said driven first chain rotating said first sprocket wheel and said shaft, a second sprocket wheel rigidly secured to said shaft in spaced relation to said first sprocket wheel, a second endless chain mounted on said second sprocket wheel, means connected to said second endless chain to cause it to move in any predetermined orbit, at least one steadying member pivotally mounted on said second endless chain, said steadying member including an element engaging fork and a fork shaped guide member, said fork shaped guide member rigidly connected to said element engaging fork and perpendicular thereto, a guide track mounted on said fixed support, said guide track comprising a rod bent to form a closed loop, said guide track positioned between the tines of said fork shaped guide member and shaped to pivot said element engaging fork into position for engaging and steadying said moving elements for a portion of said predetermined orbit.

7. An apparatus for steadying support members carried by a moving conveyor system comprising a fixed support, moving support means mounted on said fixed support, said moving support means operatively connected to said conveyor system to be driven thereby, said moving support means following an orbit, a portion of said orbit adapted to be parallel to part of any predetermined path followed by said moving conveyor system, driving means connected to said moving support means, said driving means adapted to drive said moving support means around said orbit at a speed related to the speed of said moving conveyor system, and support member steadying means pivotally mounted along said moving support means, said support member steadying means adapted to be spaced on said moving support means in accordance with the spacing of the support members on the moving conveyor system, means causing said support member steadying means to rock with respect to said moving support means between operative position to engage said support members and inoperative position out of engagement with said support members, said means being effective to rock the support member steadying means to operative position during movement of said moving support means parallel to the moving conveyor system.

8. An apparatus for steadying support members carried by a moving conveyor system comprising a fixed support, a driven member movably mounted on said fixed support, said driven member operatively connected to said conveyor system to be driven thereby, said driven member drivingly connected to a moving support to move it at a speed proportional to the speed of the moving conveyor system, said moving support following an orbit, a portion of said orbit adapted to be parallel to a part of any predetermined path followed by said moving conveyor system, at least one steadying member mounted on said moving support and mounted thereon for pivotal movement between a support member engaging position and a retracted position, guide means connected to said steadying member to rock it into said support member engaging position for a portion of its movement around said orbit so it can engage and steady said support members.

9. An apparatus for steadying support members carried by a moving conveyor system comprising a fixed support, a driven member movably mounted on said fixed support, said driven member operatively connected to said conveyor system to be driven thereby, said driven member drivingly connected to a moving support to move it at a speed corresponding to the speed of the moving conveyor system, said moving support comprising an endless chain, said endless chain following an orbit, a portion of said orbit adapted to be parallel to a part of any predetermined path followed by said moving conveyor system, at least one steadying member mounted on said endless chain for rocking movement into and out of position to engage said support members, said steadying member including a support member engaging fork and a guide member, a guide track mounted on said fixed support, said guide member riding on said guide track, said guide track shaped to cause said support member engaging fork to rock into engagement with and steady said support members for a portion of its movement around said orbit.

10. An apparatus for steadying support members carried by a moving conveyor system comprising a fixed support, a driven member movably mounted on said fixed support, said driven member operatively connected to said conveyor system to be driven thereby, said driven member drivingly connected to a moving support to move it at a speed corresponding to the speed of the moving conveyor system, said moving support comprising an endless chain, means connected to said endless chain to cause it to move in an orbit, a portion of said orbit adapted to be parallel to part of any predetermined path followed by said moving conveyor system, at least one steadying member mounted on said endless chain and pivotally mounted thereon for movement between a support member engaging position and a retracted position, said steadying member terminating in a support member engaging fork, a guide member on said steadying member, a guide track mounted on said fixed support, said guide member riding in said guide track, said guide track shaped to move said steadying member into the support member engaging position for a portion of its movement around said orbit so that the support member engaging fork can engage and steady said moving support members.

11. An apparatus for steadying support members carried by a moving conveyor system comprising a fixed support, a driven first chain movably mounted on said fixed support, said first chain drivingly connected to a second endless chain, means connected to said second endless chain to cause it to move in an orbit at a speed proportional to the speed of the moving conveyor system, a portion of said orbit adapted to be parallel to part of any predetermined path followed by said moving conveyor system, at least one steadying member pivotally mounted on said second endless chain, said steadying member including a support member engaging fork and a fork shaped guide member, said fork shaped guide member rigidly connected to said support member engaging fork, a guide track mounted on said fixed support, said guide track comprising a rod bent to form a closed loop, said guide track positioned between the tines of said fork shaped guide members and shaped to pivot said support member engaging fork into engagement with said support members for steadying them as the steadying member moves around said predetermined orbit.

12. An apparatus for steadying support members carried by a moving conveyor system comprising a fixed support, a shaft rotatably mounted on said fixed support, a first sprocket wheel rigidly secured to said shaft, a driven first chain mounted on said first sprocket wheel, said driven first chain rotating said first sprocket wheel and said shaft, a second sprocket wheel rigidly secured to said shaft in spaced relation to said first sprocket wheel, a second endless chain mounted on said second sprocket wheel, means connected to said second endless chain to cause it to move in an orbit at a speed related to the speed of the moving conveyor system, a portion of said orbit adapted to be parallel and adjacent to a part of any predetermined path followed by said moving conveyor system, at least one steadying member pivotally mounted on said second endless chain, said steadying member including a support member engaging fork and a fork shaped guide member, said fork shaped guide member rigidly connected to said support member engaging fork and perpendicular thereto, a guide track mounted on said fixed support, said guide track comprising a rod bent to form a closed loop, said guide track positioned between the tines of said fork shaped guide member and shaped to pivot said support member engaging fork into engagement with said support members for steadying them during a portion of its movement along the orbit.

13. A station for automatically transferring material from support members suspended below one moving conveyor system to support members suspended below another moving conveyor system comprising in combination a fixed support, a movable support mounted on said fixed support, motive means connected to said movable support, material holders movably mounted on said movable support, synchronization and guide means connected to said material holders to cause them to move in succession to a first transfer point in the station to be loaded with material carried by the support members on one moving conveyor system, said synchronization and guide means further moving the loaded material holders to a second transfer point adjacent the other moving conveyor system and causing them to transfer in succession the held material to said other moving conveyor system, and steadying means for steadying the support members on at least one moving conveyor system before they enter the station, said steadying means comprising a member movably mounted on said fixed support, said member connected to and driven by said one moving conveyor system and drivingly connected to a moving support to move it at a speed proportional to the speed of said one conveyor system, said moving support following an orbit, a portion of said orbit parallel to part of the path followed by said one moving conveyor system before it enters the station, at least one steadying member mounted on said moving support, and guide means connected to said steadying member to move it into steadying engagement with said support members as it moves through said portion of its orbit.

14. A station for automatically transferring material from long support members pivotally suspended below one moving conveyor system to short support members pivotally suspended below another moving conveyor system comprising in combination, a fixed support, a movable support mounted on said fixed support, motive means connected to said movable support, material holders movably mounted on said movable support, synchronization and guide means connected to said material holders to cause them to move in succession to a first transfer point wherek the moving conveyor system with the long support members first enters the station, said material holders adapted to be loaded with material carried by the long support members, said synchronization and guide means further moving the loaded material holders to a second transfer point adjacent the other moving conveyor system and causing them to transfer in succession the held material to said other moving conveyor system, and steadying means for steadying the long support members on said one moving conveyor system before they enter the station, said steadying means comprising a member movably mounted on said fixed support, said member connected to and driven by said one moving conveyor system and drivingly connected to a moving support to move it at a speed proportional to the speed of said one conveyor system, said moving support comprising an endless chain, said endless chain following an orbit, a portion of said orbit parallel to part of the path followed by said one moving conveyor system before it enters the station, at least one steadying member mounted on said endless chain, said steadying member including a support member engaging fork and a guide member, a guide track mounted on said fixed support, said guide member riding in said guide track, said guide track shaped to cause said support member engaging fork to move into steadying engagement with said support members as it moves through said portion of the orbit.

15. A station for automatically transferring material from long support members pivotally suspended below the chain links of one moving conveyor system to short support members pivotally suspended below another moving conveyor system comprising in combination, a fixed support, a movable support mounted on said fixed support, motive means connected to said movable support, material holders movably mounted on said movable support, synchronization and guide means connected to said material holders to cause them to move in succession to a first transfer point where the moving conveyor system with the long support members first enters the station, said material holders adapted to be loaded with material carried by the long support members, said synchronization and guide means further moving the loaded material holders to a second transfer point adjacent the other moving conveyor system and causing them to transfer in succession the held material to said other moving conveyor system, and steadying means for steadying the long support members on one moving conveyor system before they enter the station, said steadying means comprising a member movably mounted on said fixed support, said member comprising a sprocket chain, said sprocket chain engaging the chain links of said one moving conveyor system and driven thereby, a first sprocket wheel mounted on said fixed support and driven by said sprocket chain, a shaft rigidly connected to said first sprocket wheel and rotatable therewith, a second sprocket wheel rigidly connected to said shaft, a second endless chain mounted on and driven by said second sprocket wheel at a speed equal to the speed of said one moving conveyor system, means connected to said second endless chain to cause it to move in an arbit, a portion of said orbit adapted to be parallel with and adjacent to a part of the path followed by said moving conveyor system before it enters the station, steadying members pivotally mounted on said second endless chain and spaced on said chain so they arrive at said parallel portion of said orbit in synchronization with and opposite to the long support members arriving on said part of the path followed by said one moving conveyor system, each steadying member including a support member engaging fork and a fork shaped guide member, said fork shaped guide member rigidly connected to said support member engaging fork and perpendicular thereto, a guide track comprising a rod bent to form a closed loop, said guide track positioned between the tines of said fork shaped guide member and shaped to pivot each support member engaging fork into engagement with each long support member for steadying them as they arrive at said part of the path of said moving conveyor system parallel to said portion of said orbit.

16. A station for automatically transferring material from support members suspended below one moving conveyor system to support members suspended below another moving conveyor system comprising in combination a fixed support, a movable support mounted on said fixed support, motive means connected to said movable support, material holders movably mounted on said movable support, synchronization and guide means connected to said material holders to cause them to move in succession to a first transfer point in the station to be loaded with material carried by the support members on one moving conveyor system, said synchronization and guide means further moving the loaded material holders to a second transfer point adjacent the other moving conveyor system and causing them to transfer in succession the held material to said other moving conveyor system, and steadying means for steadying the support members on at least one moving conveyor system before they enter the station.

References Cited in the file of this patent

UNITED STATES PATENTS

| | | |
|---|---|---|
| 896,029 | Levalley | Aug. 11, 1908 |
| 1,960,719 | Stibbs | May 29, 1934 |